United States Patent [19]
Fletcher et al.

[11] Patent Number: 6,159,412
[45] Date of Patent: Dec. 12, 2000

[54] METHOD FOR MANUFACTURE OF LIQUID CRYSTALLINE POLYMER FILMS

[75] Inventors: Eldon Lawrence Fletcher, Kingston; Anthony Joseph Cesaroni, Unionville, both of Canada

[73] Assignee: Dupont Canada Inc., Mississauga, Canada

[21] Appl. No.: 08/906,540

[22] Filed: Aug. 5, 1997

Related U.S. Application Data

[60] Provisional application No. 60/025,189, Sep. 11, 1996.

[51] Int. Cl.[7] .......................... B29C 43/24; B29C 55/08; B29C 69/02; B29C 71/04
[52] U.S. Cl. .......................... 264/444; 264/479; 264/70; 264/71; 264/175; 264/210.2; 264/210.5; 264/327; 264/280; 264/173.1; 425/174.2; 425/325
[58] Field of Search .......................... 264/443, 444, 264/479, 70, 71, 72, 290.2, 210.1, 210.2, 280, 69, 173.1, 172.19, 175, 210.5, 327; 425/174.2, 325

[56] References Cited

U.S. PATENT DOCUMENTS

| | | | |
|---|---|---|---|
| 3,809,907 | 5/1974 | Schuller et al. | |
| 3,908,808 | 9/1975 | Busker | 100/35 |
| 3,917,787 | 11/1975 | Hansen | 264/146 |
| 4,140,827 | 2/1979 | Willwerth et al. | 428/151 |
| 4,524,810 | 6/1985 | Arnold | 141/250 |
| 4,828,775 | 5/1989 | Willenberg | 264/103 |
| 5,108,666 | 4/1992 | Zeroni et al. | 264/22 |
| 5,534,209 | 7/1996 | Moriya | 264/171.13 |
| 5,703,202 | 12/1997 | Jester et al. | 528/481 |

FOREIGN PATENT DOCUMENTS

| | | |
|---|---|---|
| 0 484 818 | 5/1992 | European Pat. Off. |
| 0 677 368 | 10/1995 | European Pat. Off. |
| 3-107922 | 8/1991 | Japan |
| 7-276397 | 2/1996 | Japan |

*Primary Examiner*—Jan H. Silbaugh
*Assistant Examiner*—Michael I. Poe
*Attorney, Agent, or Firm*—Joel D. Citron; Richard H. Burgess

[57] ABSTRACT

A method for making thermotropic liquid crystalline polymer films with improved transverse direction properties comprises two preferably embossed rollers which oscillate oppositely with respect to each along their respective rotational axes. Film made by passing a liquid crystalline polymer between such rolls has improved transverse direction properties. Such films are useful in multilayer containers and for circuit boards.

10 Claims, 3 Drawing Sheets

METHOD FOR MANUFACTURE OF LIQUID CRYSTALLINE POLYMER FILMS

This application claims the benefit of U.S. Provisional Application No. 60/025,189, filed Sep. 11, 1996.

FIELD OF THE INVENTION

This invention concerns a process for the preparation of a liquid crystalline polymer film by feeding a film of molten liquid crystalline polymer to rollers which oscillate along their axes with respect to another and whose surfaces are preferably slightly embossed, and wherein the temperature of the rollers is such that the film solidifies on one roller and forms a molten bead on the other roller. The resulting films have improved transverse direction properties.

TECHNICAL BACKGROUND

Thermotropic liquid crystalline polymers (LCPs) are important items of commerce, being useful as molding resins, for films, and for coatings. The most common method of forming films from thermoplastics is extrusion of the polymer through a film die. When this is done with LCPs, the polymer usually is highly oriented in the machine (extrusion) direction (MD), and is quite weak and brittle in the transverse direction (TD). Special methods have been developed to produce LCP films (or thin tubes which can be slit into films) with more balanced MD/TD properties, thus improving the TD properties of the film. However, such methods, which for instance are described in U.S. Pat. Nos. 4,384,016, 4,820,466, 4,963,428, 4,966,807, 5,156,785, 5,248,305,288,529, 5,312,238, and 5,326,245 and G. W. Farrell, et al., Journal of Polymer Engineering, vol. 6, p. 263–289 (1986), usually require the use of intricate, expensive equipment which may be difficult to operate reliably, produce tubes which may not lay flat as films, and/or require labor intensive lay-up methods. One of these methods is moving in the TD an extrusion die surface which contacts the molten LCP. Thus better methods of preparing improved LCP films are needed.

SUMMARY OF THE INVENTION

This invention concerns, a process for the production of a final thermotropic liquid crystalline polymer film, comprising, feeding a first film of a molten thermotropic liquid crystalline polymer to a pair of rollers which have a gap between them which is approximately equal to a thickness of said first film, and passing said molten thermotropic liquid crystalline polymer through said gap, provided that:

said rollers oscillate relative to one another and parallel to their rotational axes at a frequency of about 20 to about 200 Hz;

said rollers are at such a temperature or temperatures that said thermotropic liquid crystalline polymer freezes against one roller, and on the other roller a rolling bank of molten thermoptropic liquid crystalline polymer is formed;

and provided that said temperature or temperatures and said frequency is such that said thermotropic liquid crystalline polymer is further oriented in a transverse direction.

This invention also concerns an apparatus, comprising, two rollers with a gap between them, said rollers rotating in opposite directions, each of said rollers having an axis of rotation, and said rollers oscillating in opposite directions with respect to one another along their respective axes of rotation at a frequency of about 20 to about 200 Hz.

In all of the Figures, motors and drives for rotating the rollers 5 and 6 are not shown, and neither are supports or bearings for 5 and 6 (except for 15b and 15a), or means for heating any of the heated rollers.

Figure 2:
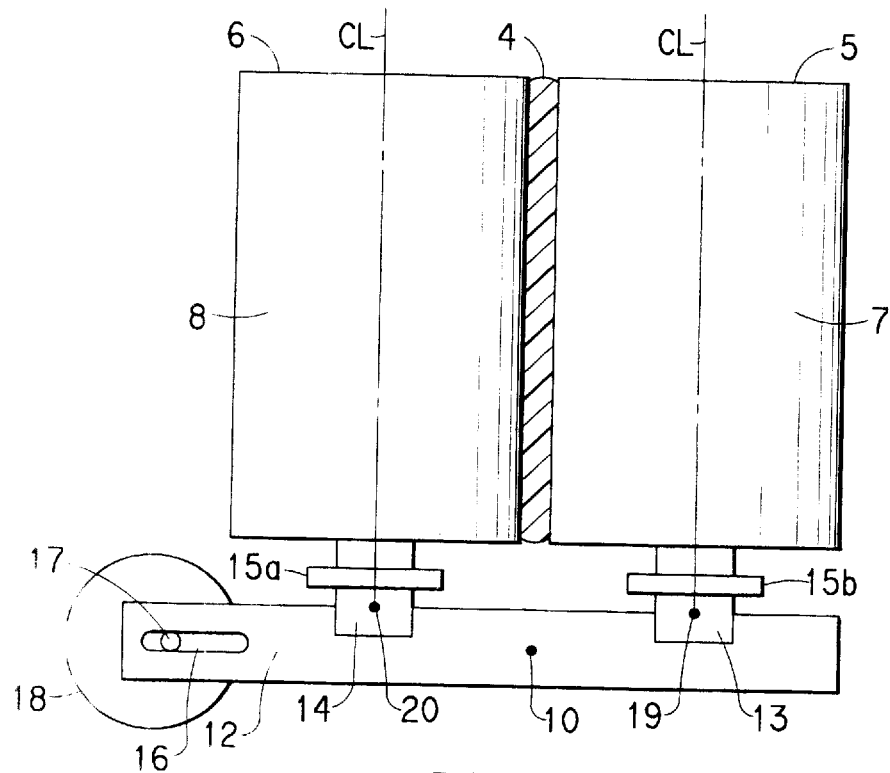
FIG. 2 shows the same rollers 5 and 6 and rolling bank 4 from the top, together with one method of oscillating the rollers 5 and 6 parallel to the axis (center line) of each of these rollers. Lever 9 is connected to a fixed point by pin 10, and to arms 13 and 14 by pins 19 and 20 respectively. The arms 13 and 14 are connected to rollers 5 and 6 respectively, through thrust bearings 15a and 16b respectively, allowing rollers 5 and 6 to rotate while being oscillated. Lever 9 contains slot 16 into which cam 17 is fitted. Motor 18 rotates cam 17 thereby causing lever 9 to oscillate approximately perpendicularly to the rotational axes of rollers 5 and 6. This causes 5 and 6 to oscillate in directions opposite to each other and parallel to their rotational axes.
Figure 3:
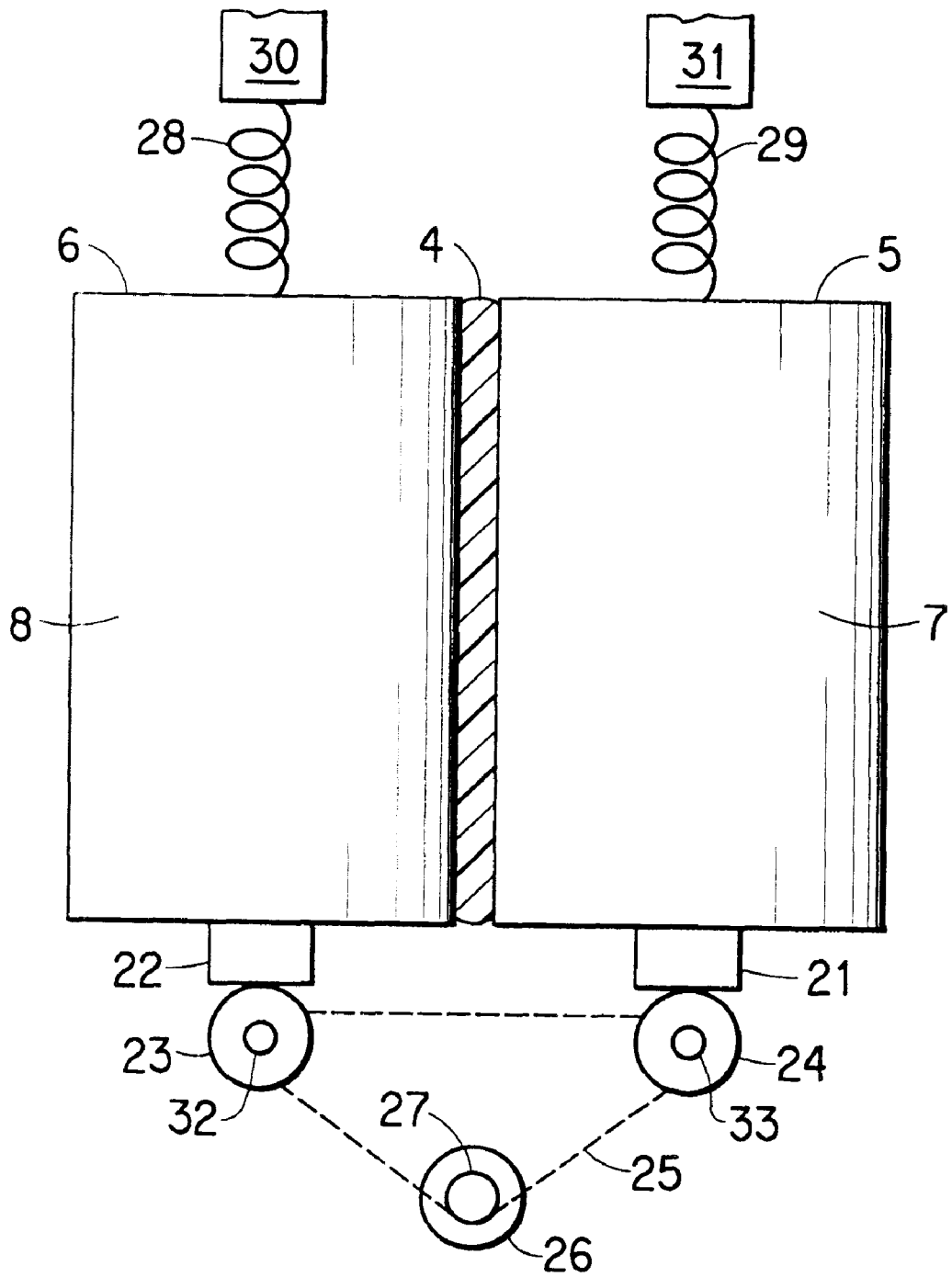
FIG. 3 shows another method of oscillating rollers 5 and 6, and the view is the same as FIG. 2. Rollers 5 and 6 have extensions 21 and 22 respectively. Cams 23 and 24 contact extensions 22 and 21 respectively. Cams 23 and 24 are attached to shafts 33 and 32 respectively, which are driven by toothed belt or chain 25. The belt or chain 25 is driven by motor 26. Cams 24 and 23 are arranged so that they will oscillate rollers 5 and 6 in opposite directions. Springs (or their equivalent) 28 and 29 push against fixed points 30 and 31 respectively, and against rollers 5 and 6 respectively, thereby assuring that 21 and 22 ride against cams 23 and 24 respectively.

In FIG. 2, removal of one of the pins 19 or 20 would clearly cause only one of 5 or 6 to oscillate. Similarly, in FIG. 3, removal of one of cams 23 or 24 would cause oscillation of only one of rollers 5 and 6. Oscillation of only one roller is also useful in this invention, since the rollers are still oscillating with respect to one another parallel to their axes of rotation.

Figure 1:
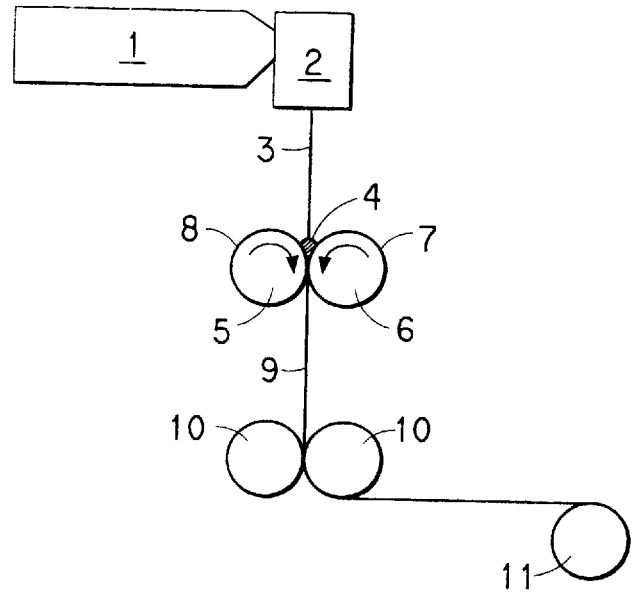
FIG. 1 is a schematic drawing from the side, of an apparatus for carrying out the LCP film forming process described herein. An extruder, 1, supplies molten LCP to slit die 2 from which issues molten LCP film 3. This molten film falls vertically until it contacts approximately simultaneously surfaces 7 and 8 of rollers 5 and 6, respectively. Rolling bank 4 of LCP is also present. Rollers 5 and 6 are driven in rotation in the directions shown. LCP film 9 exits the gap from between rollers 5 and 6, goes between (optional) cooling rollers 9 and 10, and is wound up on windup roll 11.
Figure 4:
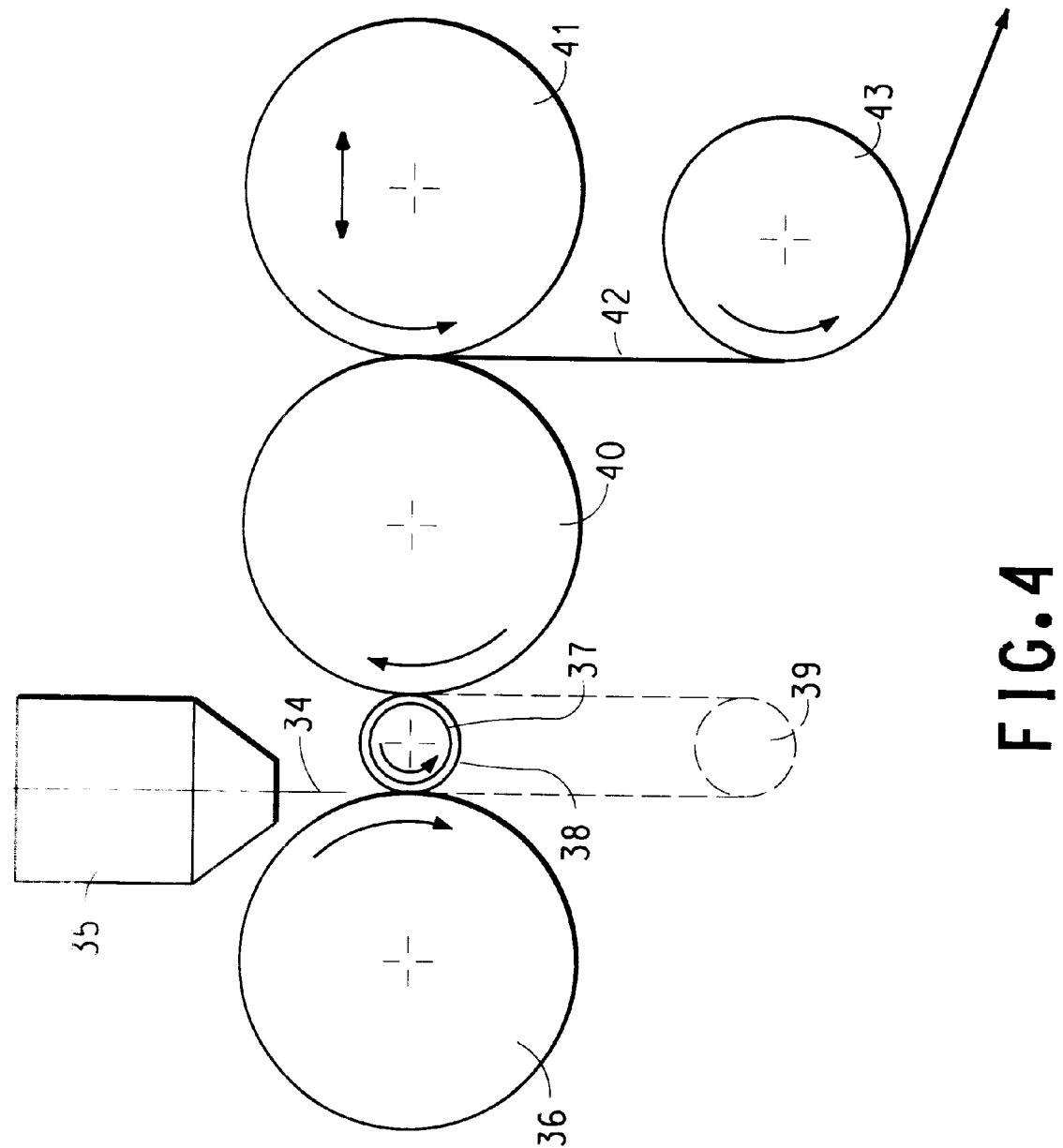

FIG. 4 is similar to the view shown in FIG. 1, and illustrates an alternate arrangement of rollers. The rotational direction of each of the rollers is shown by an appropriate arrow. Molten LCP 34 issues from die 35 to contact the (optionally embossed) surfaces of heated, fixed (horizontally and vertically, but it may still rotate), driven roller 36 and heated, optionally driven, oscillating roller 37 which is covered by sleeve 38. The LCP passes through the nip (gap) formed by rollers 36 and 37. Oscillating roller 37 has an alternate position 39 for initial stringup of the LCP film. The LCP film goes around roller 37 into a nip (gap) formed by roller 37 and fixed, driven, heated roller 40, whose surface is optionally embossed. The molten LCP film then goes partially around roller 40 into the nip formed by roller 40 and driven, heated roller 41, which may be moved in the direction indicated by the double-headed arrow in order to help fix the final thickness of the LCP film, and possibly flatten the surface of the film, if needed. The LCP film 42 then passes over fixed, driven roller 43 and proceeds on to a windup apparatus (not shown). In this apparatus the LCP film actually passes through two nips (or passes twice) between rollers oscillating with respect to one another.

DETAILS OF THE INVENTION

The LCP used herein is fed to the oscillating rollers in the form of a molten film. By an LCP is meant a polymer that is anisotropic when tested in the TOT Test described in U.S. Pat. No. 4,118,372. By molten is meant the polymer is above its glass transition temperature and essentially free of crystallites (but still liquid crystalline). It will usually be above its melting point. The molten film may be provided by any expedient means, for instance melting a preexisting film and feeding it to the rolls, or more conveniently melting the LCP in an extruder and extruding the polymer through an ordinary film die. It is most convenient to vertically extrude the film downward, so that it "falls" by gravity towards the rollers.

The rollers employed can preferably be heated (see below). The axis of rotation of both rollers will usually be parallel to each other, and the gross surface of each roller will usually be parallel to the axis of rotation of that roller, and at a constant distance from that axis. Typically the rollers will be of metal construction. For convenience the gap between the rollers should preferably be adjustable so that films or sheets of different thicknesses may be readily produced. The rollers are of course driven so that the molten LCP is drawn into the gap between the rollers. The speed of the rollers is preferably adjustable so that the rate that LCP exits the rollers is preferably approximately equal rate of molten LCP feed to the rollers, except as noted below. The rollers are both preferably the same diameter and/or are both driven at the same surface speed through the gap.

The surfaces of the rollers may be embossed with a pattern that is designed to put at least some transverse shear on the polymer as it goes through the nip of the rollers which are oscillating with respect to one another. The angle of the embossing with respect to the axis of oscillation should be greater than 0°. Generally speaking as this angle goes from 0° to 90° the amount of transverse shear imparted to the LCP film increases. Likewise, the deeper the embossing and/or the sharper the ridges of the embossing the greater the transverse shear imparted to the LCP film. Typical depths of embossing are about 0.02 to about 0.15 mm, but this of course is dependent on the angle of embossing and sharpness of the ridges. Useful embossing patterns are readily ascertainable with minimal experimentation by the artisan, and some useful patterns are described in the Examples.

The temperature of at least one the rollers should be such that the surface of the polymer which contacts that roller freezes or solidifies rapidly as the LCP film contacts that roller. This will normally be somewhere below the melting point of the LCP used, or if the polymer is amorphous at ambient temperature, below the glass transition temperature.

The temperature of the second roller is such that a relatively small rolling bank of polymer which is molten or at least mobile is formed in the nip on the second roller's side of the film at it enters the nip, and in the nip at least part of the polymer is molten or at least mobile. As the film exits the nip both surfaces are essentially solid, although some of the polymer in the interior of the film may yet be molten.

In addition, the temperature of the rollers should be below the point at which the film exiting the rollers sticks to the rollers. It has been found that at least in some cases both rollers may be at the same temperature. A suitable temperature range for each or both rollers is determined in part by the process conditions, such as the speed at which the rollers operate, the thickness of the film, the temperature of the LCP coming into the rollers, the tendency of the LCP to stick to the particular surface of the rollers used, and other factors. The operable temperature range for the rollers may be readily determined by minimal experimentation, and such temperatures are illustrated in the Examples.

Heating of the rollers can be accomplished by a number of methods known to the art, such as by hot oil or electrically. It is preferred that the roller temperatures can be controlled relatively accurately (e.g., within 1 to about 2° C.) so that uniform film may be produced.

Preferred film thicknesses, both entering and exiting the rollers are about 0.012 to about 0.25 mm, more preferably about 0.02 to about 0.10 mm.

The rollers are oscillated with respect to one another parallel to their axes of rotation. One or both rollers may actually move in this direction (oscillate), or just one roller may oscillate and the other may be fixed in this respect (but still rotate). It has been found that a frequency of oscillation of about 20 to about 200 Hz is a useful range, preferably about 30 to about 150, more preferably about 60 to about 100 Hz whether one or both rollers is actually moved. The amplitude of oscillation can be about 0.5 to about 8 mm, preferably about 1.5 to about 6 mm, this amplitude being the total motion of the two rollers with respect to each other parallel to their axes of rotation.

As more and more transverse orientation is induced in the LCP, the physical properties in the transverse direction, such as tensile strength, tensile modulus and tensile strain to break will also increase. This increase is often, although not necessarily, at the expense of the machine direction properties. Numerous variables may affect the degree of transverse orientation of the LCP in the final film. Among these are roller oscillation frequency, roller rotational speed, roller temperature, type of roller surface (for instance smooth or embossed), roller oscillation frequency, LCP melt temperature, LCP viscosity, and the film thickness.

It is believed that in many cases, as the following are increased, the TD orientation is affected as noted:
  increasing roller oscillation frequency—increases TD orientation (up to a point)
  increasing rotational roller speed—decreases TD orientation
  increasing roller temperature—decreases TD orientation
  increasing roller oscillation amplitude—increases TD orientation
  increasing LCP melt temperature—decreases TD orientation
  increasing LCP viscosity—increases TD orientation
  increasing film thickness—decreases TD orientation In addition, embossing affects the orientation of the resulting LCP film. A roller with a relatively smooth surface may be used, but in this instance the temperature must be controlled very closely, so that this viscosity of the LCP at the roller nip is quite high, but not so high as to prevent the polymer from passing between the rollers. If the rollers are embossed, such tight temperature control is not necessary. Generally speaking the deeper the embossing, or the closer to perpendicular to the oscillation direction the embossing is the embossing is, the more the LCP will be oriented in the TD. Also, if the embossed "lines" have steep walls, as opposed to gently sloping walls, the TD orientation will be increased.

One preferred form of embossing is a diamond knurled patter (see Roll C below), or a double diamond knurled pattern is especially preferred. By double diamond knurled is meant there are two independent diamond knurled patterns present, which leads to diamonds of different sizes embossed on the surface.

Many of the above factors will be illustrated in the Examples.

The LCP films formed by this process have improved transverse direction properties compared to films that are extruded through a simple slit die. It is preferred that the maximum tensile strength in the TD is at least 50 percent of the maximum tensile strength in the MD, more preferably the TD is at least 75 percent of the maximum tensile strength in the MD. Similarly, it is preferred that the tensile strain at break in the TD is at least 50 percent of the strain at break in the MD, more preferably the TD is at least 75 percent of the tensile strain at break in the MD. Also it is preferred that the tensile modulus (Young's modulus) in the TD is at least 50 percent of the strain at break in the MD, more preferably the TD is at least 75 percent of the tensile modulus in the MD. In simple extrusion through a slit die, these properties are typically much better in the MD than the TD.

Any thermotropic LCP may be used in this process. Suitable thermotropic LCPs, for example, are described in U.S. Pat. Nos. 3,991,013, 3,991,014 4,011,199, 4,048,148, 4,075,262, 4,083,829, 4,118,372, 4,122,070, 4,130,545, 4,153,779, 4,159,365, 4,161,470, 4,169,933, 4,184,996, 4,189,549, 4,219,461, 4,232,143, 4,232,144, 4,245,082, 4,256,624, 4,269,965, 4,272,625, 4,370,466, 4,383,105, 4,447,592, 4,522,974, 4,617,369, 4,664,972, 4,684,712, 4,727,129, 4,727,131, 4,728,714, 4,749,769, 4,762,907, 4,778,927, 4,816,555, 4,849,499, 4,851,496, 4,851,497, 4,857,626, 4,864,013, 4,868,278, 4,882,410, 4,923,947, 4,999,416, 5,015,721, 5,015,722, 5,025,082, 5,086,158, 5,102,935, 5,110,896, and 5,143,956, and European Patent Application 356,226. Useful thermotropic LCPs include polyesters, poly(ester-amides), poly(ester-imides), and polyazomethines. Preferred thermotropic LCPs are polyesters or poly(ester-amides), and it is especially preferred that the polyester or poly(ester-amide) is partly or fully aromatic.

After passing through the gap in the oscillating rollers the LCP film may be wound up. Before being wound up film may go through rolls which may accomplish other functions, such as cooling the film, or calendering the film to obtain a smoother surface.

LCP films are useful in many applications, such as in multilayer containers and circuit boards.

EXAMPLES

In the Examples, the LCP polymers used were as follows:

LCP A: An aromatic polyester, which is a copolymer of (molar ratios in parentheses): 4,4'-biphenol(26.3)/ hydroquinone(26.3)/1,6-hexanediamine(47.4)/ terephthalic acid(36.8)/2,6-naphthalene dicarboxylic acid(63.2)/4-hydroxybenzoic acid(89.5)/6-hydroxy-2-napthoic acid(36.8).

LCP B: An aromatic polyester as described in Example LCP-4 of U.S. Pat. No. 5,110,896.

The apparatus used included a ¾" (1.91 cm) Brabender (Type 2003, C. W. Brabender Instruments, Hackensack, N.J., U.S.A., used with the 10.2 cm wide film die) or a 1" (2.54 cm) Wilmod extruder (used with the 15.2 cm wide film die) which extruded the molten LCP to an adjustable lip film die which had the specified width. The extruder rear zone temperature was generally about 0 to about 30° C. above the DSC melting point of the polymer, and about 20 to about 50° C. above the melting point in the front zone. Die temperatures were usually about 30 to about 60° C. above the DSC melting point. The molten LCP film fell by gravity on the oscillating rollers, which were arranged as shown in FIG. 1. The rollers were 8.9 cm in diameter and 20.3 cm wide, and the surfaces were faced with stainless steel (except for the rollers with pattern A, which were aluminum faced). In most instances the surfaces were embossed. The rotational speeds of the rollers were manually controlled using a variable speed drive motor, the rate of oscillation was also manually controlled by a variable speed drive motor, while the amplitude of oscillation could be varied by changing the cam 17. Each roller was individually heated by Calrod® electrical heaters, which were in turn automatically controlled by digital controllers. It is believed that the roller temperatures could be maintained to about ±1° C. After passing through the oscillating rollers the film was passed through a set of cooling rolls and then rolled up on a roll.

In the beginning of the run, the speed of extrusion and rotation of the oscillating rollers were adjusted so that a rolling bank of the polymer built up on the oscillating rollers, and then the speed of the oscillating rollers was set as closely as possible to maintain a constant sized rolling bank. Occasionally some manual adjustments were needed.

The surfaces of both rollers were similar, although that is not necessary. Various roller surfaces were used, and are:

A—This roll surface was a circumferential thread with a depth of about 25 μm. There were about 17.3 threads per cm, and the threads were cut with a tool having a rounded end with a radius of 0.51 mm.

B—These rolls had a surface of V-shaped circumferential grooves (not a thread), 125 μm deep, 12.6 per cm, with an included angle at the apex of the "V" of 60°.

C—These rolls had a diamond or knurled pattern, about 50–75 μm deep, with a 90° included angle for the sides, with the knurling lines at an angle of 30° to the axis of rotation of the roll.

D—Polished surfaces, with an average roughness, $R_a$, of about 0.05 to about 0.1 μm.

E—These rolls had a spiral groove, 11 per cm, 150 μm deep, with V-shaped sides having an included angle of 90°, and the angle of the spiral to the axis of rotation was 30°.

In all the Examples, the Maximum Stress, Strain at Break, and Young's Modulus are all tensile measurements, measured using ASTM D882-91.

Example 1

In this Example the following were conditions or apparatus or polymer used: oscillating roller (both) temperature 202° C.; oscillating roller surfaces C or E; LCP A; oscillating roller rotational surface speed 5.5 m/min; length of oscillation of each roller, 0.32 cm; width of film die 10.2 cm. Other conditions are specified in Tables 1 and 2. Table 1 gives the results for roller surface E, while Table 2 gives the results for roller surface C. The data in Tables 1 and 2 show the effect of varying the oscillating roller frequency, and the differences between Tables 1 and 2 illustrate differences between using roller surface E and roller surface C.

TABLE 1

| MD or TD | Film Thickness, mm | Max. Stress, MPa | Strain at Break, % | Modulus at 2% Strain, GPa | Young's Modulus MPa | Roll Oscil., Hz |
|---|---|---|---|---|---|---|
| MD | 0.142 | 83.8 | 10 | 2.68 | 3.03 | 60 |
| TD | 0.145 | 73.8 | 26.2 | 2.10 | 2.64 | |
| MD | 0.120 | 70.8 | 15.3 | 1.83 | 2.17 | 100 |
| TD | 0.131 | 127 | 23.7 | 1.99 | 1.96 | |
| MD | 0.122 | 82.9 | 8.2 | 3.29 | 4.03 | 90 |
| TD | 0.125 | 116 | 21.8 | 2.25 | 2.42 | |
| MD | 0.136 | 74.9 | 13.8 | 2.78 | 3.57 | 80 |
| TD | 0.137 | 94.9 | 22.8 | 2.24 | 2.61 | |
| MD | 0.142 | 75.6 | 15.9 | 2.91 | 3.57 | 70 |
| TD | 0.141 | 73.4 | 27.2 | 1.82 | 2.22 | |
| MD | 0.133 | 81.7 | 18 | 2.63 | 3.48 | 50 |
| TD | 0.143 | 56.8 | 27.8 | 1.62 | 2.00 | |
| MD | 0.147 | 83.0 | 20 | 3.52 | 3.73 | 40 |
| TD | 0.154 | 50.1 | 18.4 | 1.38 | 1.73 | |
| MD | 0.176 | 95.4 | 7.1 | 3.83 | 4.99 | 30 |
| TD | 0.176 | 47.1 | 21.9 | 1.28 | 1.48 | |
| MD | 0.214 | 103 | 4 | 4.21 | 4.58 | 20 |
| TD | 0.211 | 39.0 | 12.7 | 1.06 | 1.23 | |
| MD | 0.233 | 114 | 3.3 | 4.41 | 5.03 | 10 |
| TD | 0.240 | 31.3 | 8.8 | 0.905 | 1.04 | |
| MD | 0.227 | 112 | 2.7 | 4.92 | 5.73 | 5 |
| TD | 0.227 | 26.5 | 6.6 | 0.865 | 1.04 | |
| MD | 0.228 | 110 | 3 | 4.42 | 5.41 | 0 |
| TD | 0.242 | 21.8 | 5.7 | 0.741 | 0.863 | |
| MD | 0.143 | 84.3 | 20.9 | 2.72 | 3.10 | 60 |
| TD | 0.127 | 54.6 | 27.7 | 1.63 | 2.09 | |

TABLE 2

| MD or TD | Film Thickness, mm | Maximum Stress, MPa | Strain at Break, % | Young's Modulus, MPa | Roll Oscil., Hz |
|---|---|---|---|---|---|
| MD | 0.100 | 124 | 7 | 5.12 | 100 |
| TD | 0.0762 | 125 | 31.8 | 2.34 | |
| MD | 0.162 | 81.1 | 24.5 | 2.46 | 80 |
| TD | 0.123 | 81.9 | 25.6 | 2.86 | |
| MD | 0.135 | 113 | 14.3 | 3.70 | 70 |
| TD | 0.118 | 60.1 | 22.6 | 2.24 | |
| MD | 0.140 | 114 | 14.3 | 4.01 | 60 |
| TD | 0.00486 | 57.2 | 28.8 | 2.11 | |
| MD | 0.145 | 126 | 9.6 | 4.24 | 50 |
| TD | 0.147 | 46.4 | 26.2 | 2.70 | |
| MD | 0.157 | 127 | 11.6 | 3.91 | 40 |
| TD | 0.171 | 42.5 | 16.1 | 1.62 | |
| MD | 0.176 | 122 | 8.1 | 4.44 | 30 |
| TD | 0.178 | 39.7 | 11.3 | 1.53 | |
| MD | 0.171 | 130 | 8.2 | 4.79 | 20 |
| TD | 0.194 | 38.7 | 13.6 | 1.46 | |
| MD | 0.177 | 135 | 4.3 | 5.29 | 10 |
| TD | 0.173 | 29.5 | 5.1 | 1.27 | |

Example 2

In this Example the following were conditions or apparatus or polymer used: oscillating roller (both) temperature 209° C.; oscillating roller surfaces C; LCP A; oscillating roller rotational surface speed as specified; oscillation frequency 70 Hz; length of oscillation of each roller, 0.32 cm; width of film die 15.2 cm. Other conditions are specified in Table 3

TABLE 3

| MD or TD | Film Thickness, mm | Maximum Stress, MPa | Strain at Break, % | Young's Modulus, GPa | Roller Surface Speed, m/min |
|---|---|---|---|---|---|
| MD | 0.0541 | 79.2 | 30.6 | 1.39 | 5.49 |
| TD | 0.0450 | 57.7 | 7 | 2.60 | |
| MD | 0.0538 | 176 | 7 | 6.70 | 12.2 |
| TD | 0.0472 | 31.9 | 3.9 | 1.70 | |
| MD | 0.0726 | 215 | 2.9 | 8.66 | 13.7 |
| TD | 0.0787 | 19.1 | 1.5 | 1.62 | |

Example 3

In this Example the following were conditions or apparatus or polymer used: oscillating roller (both) temperature as specified; oscillating roller surfaces D; LCP A; oscillating roller rotational surface speed as specified; oscillation frequency 70 Hz; length of oscillation of each roller, 0.32 cm; width of film die 10.2 cm. Other conditions are specified in Table 4.

TABLE 4

| MD or TD | Film Thickness, mm | Maximum Stress, MPa | Strain at Break, % | Young's Modulus, GPa | Roller Temp, ° C. | Roller Surface Speed, m/min |
|---|---|---|---|---|---|---|
| MD | 0.212 | 132 | 5.7 | 2.93 | 202 | 3.05 |
| TD | 0.193 | 110 | 18.4 | 2.42 | | |
| MD | 0.157 | 106 | 6.8 | 4.09 | 202 | 5.80 |
| TD | 0.151 | 61.5 | 20.8 | 1.94 | | |
| MD | 0.0937 | 247 | 3.6 | 8.39 | 204 | 5.80 |
| TD | 0.0841 | 58.9 | 27.3 | 1.89 | | |
| MD | 0.0757 | 282 | 3.8 | 9.62 | 207 | 5.49 |
| TD | 0.0744 | 55.7 | 28.5 | 1.66 | | |
| MD | 0.0676 | 288 | 3.6 | 10.6 | 210 | 5.49 |
| TD | 0.0671 | 60.9 | 32.5 | 1.87 | | |

Example 4

In this Example the following were conditions or apparatus or polymer used: oscillating roller temperatures 209° C. or as specified; oscillating roller surfaces C; LCP B; oscillating roller rotational surface speed 2.74 m/min or as specified; oscillation frequency 70 Hz or as specified; length of oscillation of each roller 6.4 mm or as specified; width of film die 15.2 cm. Other conditions are specified in Tables 5 and 6.

TABLE 5

| MD or TD | Film Thickness, mm | Maximum Stress, MPa | Strain at Break, % | Young's Modulus, GPa | Roll Osc. Amplitude, mm |
|---|---|---|---|---|---|
| MD | 0.047 | 57.7 | 4.5 | 2.56 | 3.18 |
| TD | 0.049 | 50.2 | 2.0 | 3.42 | 3.18 |
| MD | 0.051 | 60.1 | 3.9 | 2.88 | 3.18 |
| TD | 0.053 | 52.5 | 3.0 | 2.77 | 3.18 |
| MD | 0.075 | 65.0 | 2.2 | 4.53 | 1.59 |
| TD | 0.092 | 21.1 | 2.8 | 1.06 | 1.59 |
| MD | 0.068 | 65.0 | 1.1 | 9.23 | 1.59 |
| TD | 0.066 | 26.9 | 3.2 | 1.39 | 1.59 |

TABLE 6[a]

| MD or TD | Film Thickness, mm | Maximum Stress, MPa | Strain at Break, % | Young's Modulus, GPa | Oscil. Roller Temps, °C.[b] | Roller Oscil., Hz |
|---|---|---|---|---|---|---|
| MD | 0.122 | 52.0 | 7.4 | 1.64 | 208/218 | 40 |
| TD | 0.142 | 73.4 | 2.6 | 3.88 | | 40 |
| MD | 0.111 | 58.7 | 8.3 | 1.83 | 206/219 | 62 |
| TD | 0.117 | 81.9 | 2.7 | 3.43 | | 62 |
| MD | 0.156 | 50.6 | 11.4 | 1.54 | 206/214 | 70 |
| TD | — | 122 | 2 | 4.69 | | 70 |
| MD | 0.135 | 34.4 | 7.5 | 1.25 | 206/214 | 74 |
| TD | 0.142 | 136 | 3.5 | 4.68 | | 74 |

[a]Oscillating roller surface speed 4.88 m/min.
[b]Rolls were different temperatures.

What is claimed is:

1. A process for the production of a final thermotropic liquid crystalline polymer film, comprising, feeding a first film of a molten thermotropic liquid crystalline polymer to a pair of rollers which have a gap between them which is approximately equal to a thickness of said first film, and passing said first molten thermotropic liquid crystalline polymer film through said gap to form said final thermotropic liquid crystalline polymer film, wherein:

said rollers oscillate relative to one another and parallel to their rotational axes at a frequency of about 20 to about 200 Hz as said first film passes through said gap;

one of said rollers being at such a temperature that said thermotropic liquid crystalline polymer freezes against said roller as said first film Passes through said gap;

the other roller of said rollers being at a such a temperature that a rolling bank of molten thermotropic liquid crystalline polymer is formed on said other roller as said first film passes through said gap;

both surfaces of said final film are essentially solid as said final film exits said gap; and said temperatures and said frequency are such that said thermotropic liquid crystalline polymer is oriented in the transverse direction by transverse shear on said thermotropic liquid crystalline polymer imparted by the oscillation of said rollers as said first film passes through said gap.

2. The process as recited in claim 1 wherein said first film and said final film each have a thickness of about 0.012 to about 0.25 mm.

3. The process as recited in claim 1 wherein an amplitude of said oscillation is about 0.5 to about 8 mm.

4. The process as recited in claim 1 wherein said thermotropic liquid crystalline polymer is a polyester or a poly(ester-amide).

5. The process as recited in claim 1 wherein said first film additionally passes through a gap formed by one of said rollers and a third roller, wherein said third roller oscillates at a frequency of about 20 to about 200 Hz along its axis of rotation relative to said one of said rollers.

6. The process as recited in claim 1 wherein said frequency is about 60 to about 100 Hz.

7. The process as recited in claim 6 wherein an amplitude of said oscillation is about 1.5 to about 6 mm.

8. The process as recited in claim 1 wherein a surface of said rollers is embossed in a pattern.

9. The process as recited in claim 8 wherein said pattern is diamond knurled or double diamond knurled.

10. The process as recited in claim 9 wherein an amplitude of said oscillation is about 1.5 to about 6 mm.

* * * * *